United States Patent
Zhao et al.

(10) Patent No.: US 12,513,650 B2
(45) Date of Patent: Dec. 30, 2025

(54) WIRELESS COMMUNICATION METHOD AND COMMUNICATIONS APPARATUS

(71) Applicant: QUECTEL WIRELESS SOLUTIONS CO., LTD., Shanghai (CN)

(72) Inventors: Zheng Zhao, Shanghai (CN); Ling Lyu, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 37 days.

(21) Appl. No.: 18/346,159

(22) Filed: Jun. 30, 2023

(65) Prior Publication Data
US 2023/0345411 A1  Oct. 26, 2023

Related U.S. Application Data

(63) Continuation of application No. PCT/CN2021/140915, filed on Dec. 23, 2021.

(51) Int. Cl.
*H04W 64/00* (2009.01)
*H04L 5/00* (2006.01)
*H04W 52/02* (2009.01)

(52) U.S. Cl.
CPC .......... *H04W 64/00* (2013.01); *H04L 5/0051* (2013.01); *H04W 52/0235* (2013.01)

(58) Field of Classification Search
CPC ..... H04W 76/28; H04W 4/029; H04W 76/27; H04W 64/00; H04W 52/0235; H04L 5/0051
See application file for complete search history.

(56) References Cited

U.S. PATENT DOCUMENTS

| 2015/0223085 A1* | 8/2015 | Siomina ............ H04W 52/0229 370/252 |
| 2019/0074882 A1 | 3/2019 | Zhou et al. |
| 2021/0050978 A1 | 2/2021 | Manolakos et al. |
| 2021/0076225 A1 | 3/2021 | Kim et al. |
| 2021/0084586 A1 | 3/2021 | Loehr et al. |
| 2021/0410098 A1* | 12/2021 | Bao ........................ H04W 64/00 |
| 2022/0053424 A1* | 2/2022 | Bao ..................... H04W 52/028 |

(Continued)

FOREIGN PATENT DOCUMENTS

| CN | 106992804 | 7/2017 |
| CN | 109547174 | 3/2019 |
| CN | 111526567 | 8/2020 |

(Continued)

OTHER PUBLICATIONS

Apple, "On positioning SRS transmission in CDRX," R4-2009914, 3GPP TSG-RAN4 Meeting #96-e, Aug. 17-28, 2020, 3 pages.

(Continued)

*Primary Examiner* — Matthew D. Anderson
*Assistant Examiner* — Dung L Lam
(74) *Attorney, Agent, or Firm* — Fish & Richardson P.C.

(57) ABSTRACT

A wireless communication method and a communications apparatus are provided. The method includes: determining a first time window, where the first time window is a transmission time window of a reference signal, the first time window is determined based on a discontinuous reception (DRX) on duration time, and a length of the first time window is a preset value.

17 Claims, 5 Drawing Sheets

(56) References Cited

U.S. PATENT DOCUMENTS

2022/0399976 A1* 12/2022 Wang .................... H04W 4/029

FOREIGN PATENT DOCUMENTS

| CN | 111886904 | 11/2020 | | |
|---|---|---|---|---|
| CN | 113330770 | 8/2021 | | |
| CN | 113497687 | 10/2021 | | |
| CN | 113545135 | 10/2021 | | |
| EP | 3817265 | 5/2021 | | |
| WO | WO-2020047080 A1 * | 3/2020 | ............. | H04L 27/26 |
| WO | WO 2021185276 A1 | 9/2021 | | |
| WO | WO 2021231385 A1 | 11/2021 | | |
| WO | WO-2022165096 A1 * | 8/2022 | | |

OTHER PUBLICATIONS

Huawei et al., "Remaining issues in the MAC spec," R2-2005092, 3GPP TSG RAN WG2 #110-e, Jun. 1-12, 2020, 3 pages.

Lenovo et al., "CSI/SRS reporting for WUS," R2-1912689, 3GPP TSG-RAN WG2 Meeting #107bis, Oct. 14-18, 2019, 3 pages.

PCT International Search Report and Written Opinion in International Appln. No. PCT/CN2021/140915, dated Aug. 24, 2022, 16 pages (partial English translation).

Qualcomm, "[Draft] Reply LS on CSI/SRS reporting," R1-1912928, 3GPP TSG RAN WG1 Meeting #99, Nov. 18-22, 2019, 1 page.

Vivo, "Discussion on SRS for positioning during the DRX inactive period," R2-2006545, 3GPP TSG-RAN WG2 Meeting #111, Aug. 17-28, 2020, 5 pages.

Ericsson, "RRM requirements with eMBMS enhancements," 3GPP TSG-RAN WG4 Meeting #83, R4-1706293, Hangzhou, P. R. of China, May 15-19, 2017, 8 pages.

Notice of Allowances in Chinese Appln. No. 202180016424.5, mailed on Apr. 19, 2024, 4 pages (with English translation).

Office Action in Chinese Appln. No. 202180016424.5, mailed on Feb. 8, 2024, 19 pages (with English translation).

Office Action in Chinese Appln. No. 202180016424.5, mailed on Jul. 25, 2023, 24 pages (with English translation).

Extended European Search Report in European Appln. No. 21968610.2, mailed on Feb. 3, 2025, 10 pages.

* cited by examiner

Determining a first time window — S410

WIRELESS COMMUNICATION METHOD AND COMMUNICATIONS APPARATUS

CROSS-REFERENCE TO RELATED APPLICATIONS

The present application is a continuation application of International Application No. PCT/CN2021/140915 filed on Dec. 23, 2021, the disclosure of which is hereby incorporated by reference in its entirety.

TECHNICAL FIELD

The present application relates to the technical field of communications, and more specifically, to a wireless communication method and a communications apparatus.

BACKGROUND

According to a current protocol, a terminal device can transmit a periodic sounding reference signal (SRS) and/or a semi-persistent SRS only at an active time. However, the active time of the terminal device is related to many factors and has randomness, thus causing uncertainty of a transmission time of the SRS.

SUMMARY

The present application provides a wireless communication method and a communications apparatus, to enhance certainty of a transmission time of an SRS.

According to a first aspect, a wireless communication method is provided, including: determining a first time window, where the first time window is a transmission time window of an SRS for positioning, the first time window is determined based on a discontinuous reception (DRX) on duration timer, and a length of the first time window is a static value.

According to a second aspect, a wireless communication method is provided, including: receiving a wake-up signal by a terminal device; and transmitting, by the terminal device, an SRS for positioning, where transmission of the SRS ignores the wake-up signal.

According to a third aspect, a wireless communication method is provided, including: receiving, by a neighboring cell, a transmission time window of an SRS for positioning; and measuring, by the neighboring cell, the SRS in the transmission time window of the SRS.

According to a fourth aspect, a wireless communication method is provided, including: sending, by a serving cell, a wake-up signal to a terminal device; and receiving, by the serving cell, an SRS for positioning transmitted by the terminal device, where transmission of the SRS ignores the wake-up signal.

According to a fifth aspect, a wireless communication method is provided, including: receiving, by a positioning device in a core network, first information sent by a terminal device or a serving cell, where the first information indicates an actual active time of the terminal device.

According to a sixth aspect, a wireless communication method is provided, including: sending, by a terminal device or a serving cell, first information to a positioning device in a core network, where the first information indicates an actual active time of the terminal device.

According to a seventh aspect, a wireless communication method is provided, including: receiving, by a neighboring cell, first information from a positioning device in a core network, where the first information indicates an actual active time of a terminal device.

According to an eighth aspect, a communications apparatus is provided, including: a determining module, configured to determine a first time window, where the first time window is a transmission time window of an SRS for positioning, the first time window is determined based on a DRX on duration timer, and a length of the first time window is a static value.

According to a ninth aspect, a communications apparatus is provided. The communications apparatus is a terminal device, and the communications apparatus includes: a receiving module, configured to receive a wake-up signal; and a sending module, configured to transmit an SRS for positioning, where transmission of the SRS ignores the wake-up signal.

According to a tenth aspect, a communications apparatus is provided. The communications apparatus is a base station corresponding to a serving cell, and the communications apparatus includes: a sending module, configured to send a wake-up signal to a terminal device; and a receiving module, configured to receive an SRS for positioning transmitted by the terminal device, where transmission of the SRS ignores the wake-up signal.

According to an eleventh aspect, a communications apparatus is provided. The communications apparatus is a base station to which a neighboring cell belongs, and the communications apparatus includes: a receiving module, configured to receive a transmission time window of an SRS for positioning; and a measurement module, configured to measure the SRS in the transmission time window of the SRS.

According to a twelfth aspect, a communications apparatus is provided apparatus. The communications apparatus is a positioning device in a core network, and the communications apparatus includes: a receiving module, configured to receive first information sent by a terminal device or a serving cell, where the first information indicates an actual active time of the terminal device.

According to a thirteenth aspect, a communications apparatus is provided. The communications apparatus is a terminal device or a base station corresponding to a serving cell, and the communications apparatus includes: a sending module, configured to send first information to a positioning device in a core network, where the first information indicates an actual active time of the terminal device.

According to a fourteenth aspect, a communications apparatus is provided. The communications apparatus is a base station corresponding to a neighboring cell, and the communications apparatus includes: a receiving module, configured to receive first information from a positioning device in a core network, where the first information indicates an actual active time of a terminal device.

According to a fifteenth aspect, a communications apparatus is provided, and the apparatus includes a memory and a processor, where the memory is configured to store a program, and the processor is configured to call the program in the memory to perform the method according to any one of the first aspect to the seventh aspect.

According to a sixteenth aspect, an apparatus is provided, and the apparatus includes a processor configured to call a program from a memory to perform the method according to any one of the first aspect to the seventh aspect.

According to a seventeenth aspect, a chip is provided, and the chip includes a processor configured to call a program from a memory to cause a device installed with the chip to perform the method according to any one of the first aspect to the seventh aspect.

According to an eighteenth aspect, a computer-readable storage medium is provided, and the computer-readable storage medium stores a program that causes a computer to perform the method according to any one of the first aspect to the seventh aspect.

According to a nineteenth aspect, a computer program product is provided, and the computer program product includes a program that causes a computer to perform the method according to any one of the first aspect to the seventh aspect.

According to a twentieth aspect, a computer program is provided, where the computer program causes a computer to perform the method according to any one of the first aspect to the seventh aspect.

DETAILED DESCRIPTIONS OF THE EMBODIMENTS

Communications System

Figure 1:
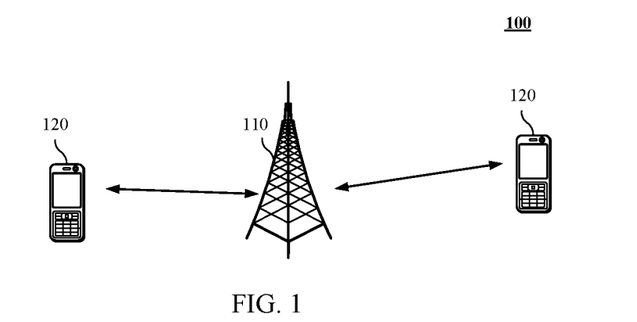
FIG. 1 is a diagram of a system architecture of a communications system to which an embodiment of the present application is applicable.

FIG. 1 shows a wireless communications system 100 to which an embodiment of the present application is applicable. The wireless communications system 100 may include a base station 110 and a terminal device 120. The base station 110 may be a device in communication with the terminal device 120. The base station 110 may provide communication coverage for a specific geographic area, and may communicate with the terminal device 120 located within the coverage.

FIG. 1 exemplarily shows one base station and two terminals. Optionally, the wireless communications system 100 may include a plurality of base station, and another number of terminal devices may be included in coverage of each base station, which is not limited in the embodiment of the present application.

Optionally, the wireless communications system 100 may further include other network entities such as a network controller and a mobility management entity, which is not limited in the embodiment of the present application.

It should be understood that the technical solutions in the embodiments of the present application may be applied to various communications systems, for example, a 5th generation (5G) system or new radio (NR), a long term evolution (LTE) system, an LTE frequency division duplex (FDD) system, and an LTE time division duplex (TDD). The technical solutions provided in the present application may also be applied to future communications systems, such as a 6th generation mobile communications system and a satellite communications system.

The terminal device in the embodiments of the present application may also be referred to as a user equipment (UE), an access terminal, a user unit, a user station, a mobile, a mobile station (MS), a mobile terminal (MT), a remote station, a remote terminal, a mobile device, a user terminal, a terminal, a wireless communications device, a user agent, or a user apparatus. The terminal device in the embodiments of the present application may be a device providing a user with voice and/or data connectivity and capable of connecting people, objects, and machines, such as a handheld device or vehicle-mounted device having a wireless connection function. The terminal device in the embodiments of the present application may be a mobile phone, a tablet computer (Pad), a notebook computer, a palmtop computer, a mobile internet device (MID), a wearable device, a virtual reality (VR) vehicle, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in smart city, a wireless terminal in smart home, or the like. Optionally, the UE may be used to act as a base station. For example, the UE may act as a scheduling entity, which provides a sidelink signal between UEs in V2X or D2D, or the like. For example, a cellular phone and a vehicle communicate with each other using a sidelink signal. A cellular phone and a smart home device communicate with each other, without the relay of a communication signal through a base station.

The base station in the embodiments of the present application may be a device for communicating with the terminal device. The base station may also be referred to as an access network device or a wireless access network device. The base station in the embodiments of the present application may be a radio access network (RAN) node (or device) that connects the terminal device to a wireless network. The base station may broadly cover various names in the following, or may be interchangeable with the following names, for example, a NodeB, an evolved NodeB (eNB), a next generation NodeB (gNB), a relay station, an access point (AP), a transmitting and receiving point (TRP), a transmitting point (TP), a master MeNB, a secondary SeNB, a multi-standard radio (MSR) node, a home base station, a network controller, an access node, a radio node, an access point (AP), a transmission node, a transceiver node, a base band unit (BBU), a remote radio unit (RRU), an active antenna unit (AAU), a remote radio head (RRH), a central unit (CU), a distributed unit (DU), and a positioning node. The base station may be a macro base station, a micro base station, a relay node, a donor node, or the like, or a combination thereof. Alternatively, the base station may be a communications module, a modem, or a chip disposed in the device or apparatus described above. Alternatively, the base station may be a mobile switching center, a device that functions as a base station in device to device D2D, vehicle-to-everything (V2X), and machine-to-machine (M2M) communications, a network-side device in a 6G network, a device that functions as a base station in a future communications system, or the like. The base station may support networks of the same or different access technologies. A specific technology and specific device form used by the base station are not limited in the embodiments of the present application.

The base station may be fixed or mobile. For example, a helicopter or drone may be configured to act as a mobile base station, and one or more cells may move according to the position of the mobile base station. In other examples, a helicopter or drone may be configured to serve as a device in communication with another base station.

In some deployments, the base station in the embodiments of the present application may be a CU or a DU, or the base station includes a CU and a DU. The gNB may further include an AAU.

The base station and the terminal device may be deployed on land, including indoor or outdoor, handheld or vehicle-mounted; or may be deployed on water; or may be deployed on an airplane, a balloon, and a satellite in the air. In the embodiments of the present application, the scenarios where the base station and the terminal device are located are not limited.

Positioning Technology in the Communications System

Figure 2:
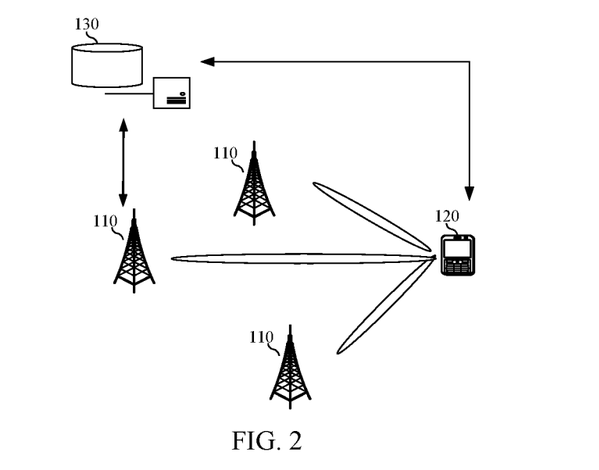
FIG. 2 is a schematic diagram of positioning and measurement performed based on the communications system shown in FIG. 1.

Referring to FIG. 2, a communications system 100 may further include a positioning device 130. The positioning device 130 may be configured to determine location information of a terminal device. The positioning device 130 may be located in a core network. The positioning device 130 may sometimes also be referred to as a positioning server. An NR system is used as an example, and the positioning device 130 may be a location management function (LMF). Another communications system is used as an example, and the positioning device 130 may be a location management unit (LMU), a location management center (LMC), or an evolved serving mobile location center (E-SMLC). It may be understood that, the positioning device 130 may alternatively be another network element, node or device for determining the location information of the terminal device, for example, may be a network element or node in a future communication system for determining the location information of the terminal device, and a name of the positioning device is not specifically limited in the embodiments of the present application.

The positioning in the communications system 100 includes uplink positioning and downlink positioning. In some communications systems (such as the NR system), downlink positioning is performed based on a positioning reference signal (PRS). The PRS, also referred to as a downlink positioning reference signal (DL-PRS), is a reference signal for a positioning function. For example, in a downlink positioning process, the terminal device 120 may first measure a PRS sent by a serving cell and a neighboring cell (or a neighbor cell), and estimate related information of positioning and measurement. The terminal device 120 may then report the related information of positioning and measurement to the positioning device 130 as a measurement result of the PRS. The positioning device 130 may calculate a location of the terminal device 120 based on the related information of positioning and measurement reported by the terminal device 120, so as to obtain the location information of the terminal device 120. For example, the positioning device 130 may calculate the location information of the terminal device 120 based on a trilateration method or a triangulation method.

In some communications systems, such as the NR system, uplink positioning is performed based on an SRS. For example, in an uplink positioning process, the terminal device 120 sends an SRS. Base stations 110 (a base station of a serving cell and a base station of a neighboring cell) may obtain a measurement result based on the SRS sent by the terminal. The measurement result of the SRS may include related information of positioning and measurement. The base stations 110 may then send the related information of positioning and measurement to the positioning device 130. The positioning device 130 may calculate a location of the terminal device 120 based on the related information of positioning and measurement reported by the base stations 110, so as to obtain the location information of the terminal device 120. For example, the positioning device 130 may calculate the location information of the terminal device 120 based on a trilateration method or a triangulation method.

The related information of positioning and measurement may include one or more of the following information: time information, distance information, power information, and angle information. More specifically, the related information of positioning and measurement may include one or more of the following information: a time difference of arrival (TDOA), an angle difference of arrival (ADOA), a reference signal received power (RSRP), and the like.

DRX Mode

Figure 3:
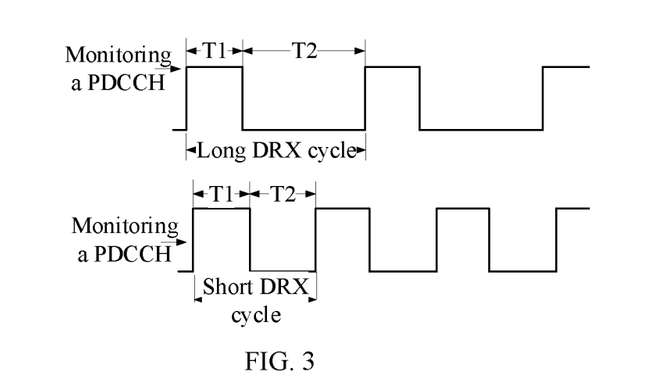
FIG. 3 is a schematic diagram of a DRX cycle.

FIG. 3 is a schematic diagram of a DRX cycle. As shown in FIG. 3, T1 is a wake-up time of a terminal device, or referred to as DRX on duration. T2 is a dormant time of the terminal device, or referred to as opportunity for DRX.

A time length of the wake-up time of the terminal device may be controlled by a DRX on duration timer (drx-onDurationTimer). A timing duration of the DRX on duration timer is T1. The terminal device needs to continuously monitor a physical downlink control channel (PDCCH) in the wake-up time T1, and may not monitor the PDCCH in the dormant time T2. It may be understood that, the longer the T2, the lower power consumption of the terminal device.

As can be seen from FIG. 3, for a long DRX cycle, a wake-up frequency of the terminal device is relatively low, and therefore more power is saved for the terminal device; and for a short DRX cycle, a wake-up frequency of the terminal device is relatively high, which increases power consumption of the terminal device, but a probability of successful scheduling of the terminal device by a base station may be improved, thereby reducing data transmission delay.

Each medium access control (MAC) entity corresponds to a DRX configuration. The DRX configuration may include the DRX on duration timer described above. In addition, another DRX timer may be included in the DRX configuration to jointly adjust the wake-up time of the terminal device.

The another DRX timer mentioned herein may include, for example, one or more of the following timers: a DRX inactivity timer (drx-InactivityTimer), a short DRX cycle timer (drx-ShortCycleTimer), a DRX downlink retransmission timer (drx-RetransmissionTimerDL), and a DRX downlink hybrid automatic repeat reQuest (HARQ) round-trip time (RTT) timer (HARQ-RTT-TimerDL).

The DRX inactivity timer may indicate how long a PDCCH needs to be monitored after the terminal device successfully detects the PDCCH. The short DRX cycle timer may indicate a duration for which the terminal device follows a short DRX cycle. The DRX downlink retransmission timer may be used by the terminal device to receive downlink retransmission schedule. The DRX downlink retransmission timer may indicate a duration for continuously performing monitoring in order to receive desired downlink retransmission schedule. The DRX downlink hybrid automatic repeat request round-trip time (RTT) timer (HARQ-RTT-TimerDL) is used by the terminal device to receive downlink retransmission schedule, indicating a duration that the terminal device needs to wait before receiving desired downlink retransmission schedule.

Further, a base station may configure other DRX parameters for the terminal device, such as a short DRX cycle, a long DRX cycle and DRX start subframe offset (drx-LongCycleStartOffset), and a DRX slot offset (drx-SlotOffset); and configure other DRX timers for the terminal device, such as a random access contention resolution timer (ra-ContentionResolutionTimer), a DRX uplink retransmission timer (drx-RetransmissionTimerUL), and a DRX uplink HARQ round-trip time timer (HARQ-RTT-TimerUL).

In a DRX mechanism, configuration of a long DRX cycle may be a default configuration, and configuration of a short DRX cycle may be an optional configuration. For a terminal device configured with a short DRX cycle, conversion between the long DRX cycle and the short DRX cycle may be performed in the following manner.

When any of the following conditions are satisfied, the terminal device uses the short DRX cycle: 1. The DRX inactivity timer (drx-InactivityTimer) expires; and 2. The terminal device receives a DRX command MAC CE (DRX Command MAC CE).

When any of the following conditions are satisfied, the terminal device uses the long DRX cycle: 1. The short DRX cycle timer (Drx-shortCycleTimer) expires; and 2. The terminal device receives a long DRX command MCA CE (long DRX command MAC CE).

No matter the long DRX cycle or the short DRX cycle is used, if one or more of the following cases occurs, the terminal device is in a DRX active state (sometimes also referred to as a DRX on state), and a time corresponding to the DRX active state may be referred to as a DRX active time.

Case 1: Any one of the DRX on duration timer, the DRX inactivity timer, the DRX downlink retransmission timer, the DRX uplink retransmission timer, and the random access contention resolution timer is running.

Case 2: The terminal device transmits a scheduling request (SR) on a PUCCH and makes the SR pending.

Case 3: A HARQ buffer of the terminal device has data and waits for uplink grant (UL grant) for HARQ retransmission.

Case 4: The terminal device has successfully received a random access response (RAR) that responds to a preamble not selected by an MAC entity, but has not received a PDCCH indicating an initial transmission and using a cell radio network temporary identifier (C-RNTI) of the MAC entity.

In a DRX cycle, except for the DRX active time, the remaining time may be referred to as an inactive time or a dormant time of DRX. During the dormant time, the terminal device is in a dormant state (sometimes also referred to as a DRX off state).

Positioning in the DRX Mode

When the terminal device is in the dormant state, a current protocol specifies that the terminal device is not allowed to send a periodic SRS or a semi-persistent SRS, but may send a non-periodic SRS. In addition, when the terminal device is in the dormant state, the current protocol does not restrict the terminal device from measuring a PRS. It may be seen that even in the dormant state, the terminal device may send an SRS for uplink positioning (such as the non-periodic SRS), or may measure a PRS for downlink positioning. Thus, according to the current protocol, the DRX mode and uplink and downlink positioning are designed independently of each other.

Wake-Up Signal

For further power saving of the terminal device, some communications systems (such as NR Rel-16) introduce a wake-up mechanism based on a wake-up signal (or referred to as a power-saving wake-up signal). The wake-up signal can be used in combination with a DRX mechanism. For example, the terminal device may receive a wake-up signal before a DRX on duration. If the terminal device has data transmission in one DRX cycle, the wake-up signal may wake up the terminal device, so that the terminal device detects a PDCCH during the DRX on duration. If the terminal device has no data transmission in one DRX cycle, the wake-up signal may not wake up the terminal device. In this case, the terminal device may not start a DRX on duration timer, so that detection of the PDCCH is not required. Thus, the introduction of the wake-up signal makes it possible for the terminal device to omit PDCCH detection during a specific DRX on duration or some DRX on durations, thereby achieving further power saving. It should be noted that, in this embodiment of the present application, if a communications system supports the wake-up mechanism, the terms "wake-up state" and "active state" may be used interchangeably with the terms "wake-up time" and "active time" according to a specific context.

As can be seen from the foregoing description, when the terminal device is not in an active state, a current protocol specifies that the terminal device is not allowed to transmit a periodic SRS or a semi-persistent SRS. However, it is difficult to predict an active time of the terminal device. For example, after a base station transmits DRX configuration information to the terminal device through RRC or an MAC CE, the terminal device needs to determine to enter an active time or end an active time in combination with the DRX configuration information and an actual packet incoming case. That is to say, only a possible active time of the terminal device can be inferred from DRX configuration alone, and the actual packet incoming case is usually difficult to learn in advance. In addition to the actual packet incoming case, the active time is also related to a lot of other parameters (specifically, reference may be made to Case 1 to Case 4 listed in the section "DRX mode"), which further increases uncertainty of the active time. In addition, in a communications system supporting the wake-up mechanism, the active time of the terminal device is also related to the wake-up signal. For example, if the terminal device receives a wake-up signal, the wake-up signal may instruct the terminal device to start or not start the DRX on duration timer. If the wake-up signal instructs the terminal device not to start the DRX on duration timer, a duration configured by the DRX on duration timer does not belong to the active time.

The unpredictability of the active time may result in a transmission time of a periodic SRS and/or a semi-persistent SRS being random, thereby increasing uncertainty of a communication process.

In addition to the foregoing problem, current protocols have a problem of distortion of neighboring cell measurement. Specifically, according to the current protocols, the neighboring cell cannot learn when the terminal device is in the dormant state, thus failing to learn a valid measurement time of the periodic SRS and/or the semi-persistent SRS. In this case, even if the terminal device does not send a periodic SRS or a semi-persistent SRS, the neighboring cell continues to measure the SRS, resulting in distortion of neighboring cell positioning and measurement. After the neighboring cell reports a measurement result to a positioning device of a core network, the positioning device jointly performs location calculation on measurement results of a plurality of cells, thereby obtaining a position estimation of the terminal device. However, since the measurement result reported by the neighboring cell is inaccurate, accuracy of the location estimation of the terminal device is seriously reduced.

To resolve one or more of the foregoing problems, the embodiments of the present application are described in detail below.

Figure 4:
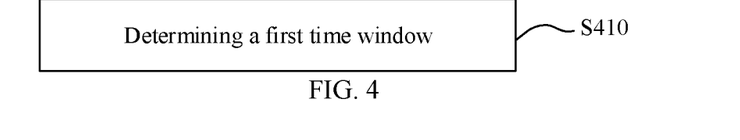
FIG. 4 is a schematic flowchart of a wireless communication method according to an embodiment of the present application.

FIG. 4 is a schematic flowchart of a wireless communication method according to an embodiment of the present application. The method illustrated in FIG. 4 may be performed by any one of the terminal device, the base station, and the positioning device in the core network described above. For example, the method illustrated in FIG. 4 is performed by a base station, and the base station may be a base station to which a serving cell belongs or a base station to which a neighboring cell belongs. In other words, the method illustrated in FIG. 4 may be performed by a serving cell or by a neighboring cell.

Referring to FIG. 4, in Step S410, a first time window is determined. The first time window is a transmission time window (or a transmission period) of an SRS.

In some embodiments, the SRS may be an SRS for positioning.

In some embodiments, the SRS may be a periodic SRS and/or a semi-persistent SRS. For example, the SRS may be a periodic SRS and/or a semi-persistent SRS for positioning.

In some embodiments, the first time window may be pre-configured (or pre-defined) by a protocol or by a base station.

In some embodiments, the first time window may be determined based on a DRX on duration timer. Alternatively, the first time window may be associated with a DRX on duration timer (for example, associated with a run time of the DRX on duration timer). For example, a parameter of the first time window (such as a start point and/or a length of the first time window) may be determined based on a parameter of the DRX on duration timer, (such as a start point (or referred to as a start run time) and/or a run duration of the DRX on duration timer). The start run time of the DRX on duration timer is configured in advance through higher layer signaling, and therefore when a system does not configure a wake-up signal, the start run time of the DRX on duration timer is not dynamically changed, but may be predicted in advance and notified to a neighboring cell or a positioning device of a core network. In addition, in a DRX cycle, in the run time of the DRX on duration timer, the terminal device is definitely woken up, that is, according to the embodiment of the present application, positioning measurement is set at a time period related to a time at which the terminal device is definitely woken up. A measurement time is configured in a non-dynamic interval that may be activated. In this way, the neighboring cell or the positioning device may be notified in advance, so that the neighboring cell or the positioning device may perform measurement at an active time, thereby reducing power consumption.

For example, Step S410 is performed by a terminal device or a serving cell, and then Step S410 may be replaced with "determining a first time window based on a DRX on duration timer". For example, Step S410 is performed by a positioning device in a core network, and then Step S410 may be replaced with "determining a first time window based on a notification message sent by a terminal device or a serving cell". For example, after the first time window is determined by the terminal device or the serving cell based on the DRX on duration timer, the first time window may be transmitted to the positioning device in a form of a notification message. For example, Step S410 is performed by a neighboring cell, and then the neighboring cell may determine a first time window based on a notification message of a positioning device or a serving cell. For example, after the first time window is determined by the serving cell based on a DRX on duration timer, the first time window may be transmitted to a neighboring cell in a form of a notification message. After obtaining the first time window, the neighboring cell may perform neighboring cell measurement on an SRS based on the first time window, and report a measurement result to the positioning device.

In some embodiments, the first time window may be in a duration corresponding to the DRX on duration timer.

In some embodiments, a start point of the first time window may be the same as a start point of the DRX on duration timer.

In some embodiments, a length of the first time window may be a static value. The length of the first time window being a static value means that the length of the first time window may be determined only based on higher layer signaling (for example, derived from higher layer signaling only) and does not dynamically change with data (such as PDSCH) scheduling.

In some embodiments, the first time window may be used in a case that there is no wake-up signal. For example, if there is no wake-up signal, Step S410 may be performed; if there is a wake-up signal, Step S410 may not be performed. "There is a wake-up signal" herein may refer to that a system is configured with a wake-up signal, and "there is no wake-up signal" may refer to that the system is not configured with a wake-up signal. If the system is configured with a wake-up signal, a base station sends a wake-up signal to the terminal device to indicate whether the terminal device needs to be woken up to start the DRX on duration timer. Correspondingly, if the system is not configured with a wake-up signal, the base station does not transmit a wake-up signal to the terminal device. In this case, the DRX on duration timer is generally started according to the DRX cycle.

In some embodiments, the first time window may be used in a case that there is a wake-up signal. When the first time window is used in a case that there is a wake-up signal, transmission of an SRS may ignore the wake-up signal (or transmission of an SRS may be independent of the wake-up signal). That the "transmission of an SRS ignores the wake-up signal" may refer to, for example, instructing, by means of protocol pre-configuration or higher layer signaling configuration, the terminal device still to transmit a periodic SRS and/or a semi-persistent SRS in a duration configured by the DRX on duration timer (so that positioning measurement is performed); or instructing, by means of protocol pre-configuration or higher layer signaling configuration, the terminal device not to transmit a periodic SRS and/or a semi-persistent SRS in a duration configured by the DRX on duration timer (so that no positioning measurement is performed).

In some embodiments, whether transmission of the SRS ignores a wake-up signal may be determined by indication information sent by a serving cell. The indication information may be used to indicate whether transmission of an SRS (such as a periodic SRS and/or a semi-persistent SRS for positioning) ignores a wake-up signal. The indication information may be, for example, higher layer signaling.

In conclusion, in the case that there is no wake-up signal, a start point (or a start run time) of the DRX on duration timer is previously configured by higher layer signaling. Therefore, in the case that there is no wake-up signal, the start point of the DRX on duration timer is not dynamically changed, but may be predicted in advance and notified to a neighboring cell or a positioning device. In other words, in the case that there is no wake-up signal, a run time of the DRX on duration timer is generally predictable, and the terminal device is definitely woken up during this time. According to this aspect, in this embodiment of the present application, the transmission time window (namely, the first time window mentioned above) of the SRS is set in a relevant time period of a duration corresponding to the DRX on duration timer, so that the transmission time window of the SRS is deterministic. For example, the first time window may be set in the run time of the DRX on duration timer. In this way, the first time window may be notified in advance to the neighboring cell or the positioning device, so that the neighboring cell and the positioning device may perform positioning measurement in an active time of the terminal device, thereby reducing power consumption.

Figure 5:
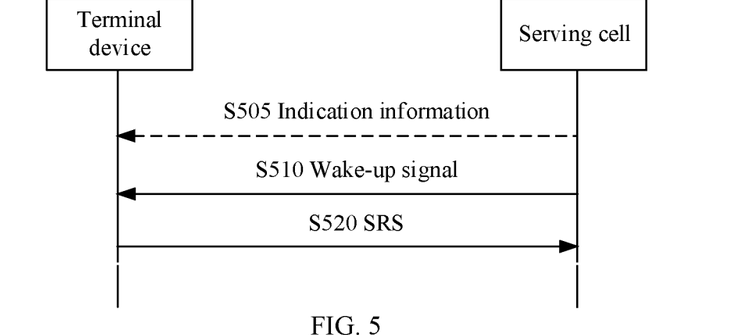
FIG. 5 is a schematic flowchart of a wireless communication method according to another embodiment of the present application.

FIG. 5 is a schematic flowchart of a wireless communication method according to another embodiment of the present application. The method illustrated in FIG. 5 is described from the perspective of interaction between a terminal device and a serving cell.

Referring to FIG. 5, in Step S510, a serving cell sends a wake-up signal to a terminal device. In Step S520, the terminal device transmits an SRS, and transmission of the SRS ignores the wake-up signal (or transmission of the SRS is independent of the wake-up signal).

In some embodiments, the SRS may be an SRS for positioning.

In some embodiments, the SRS may be a periodic SRS and/or a semi-persistent SRS. For example, the SRS may be a periodic SRS and/or a semi-persistent SRS for positioning.

It may be learned from the description in the section "Wake-up signal" mentioned above that when a system is configured with a wake-up signal, according to indication of the wake-up signal, a DRX on duration timer may not run in a duration configured by the DRX on duration timer. Therefore, the terminal device may be not woken up to enter an active time in the duration configured by the DRX on duration timer. According to the current standards, if a terminal device is not woken up to enter an active time, the terminal device does not transmit a periodic SRS and/or a semi-persistent SRS for positioning in the duration configured by the DRX on duration timer. Thus, introduction of the wake-up signal may result in uncertainty of a transmission time of the periodic SRS and/or the semi-persistent SRS.

In order to avoid an impact of the wake-up signal on the transmission time of the periodic SRS and/or the semi-persistent SRS, the embodiment of the present application proposes that the wake-up signal is ignored when the terminal device transmits the periodic SRS and/or the semi-persistent SRS. That the "transmission of an SRS ignores the wake-up signal" may refer to, for example, instructing, by means of protocol pre-configuration or higher layer signaling configuration, the terminal device still to transmit the periodic SRS and/or the semi-persistent SRS in the duration configured by the DRX on duration timer (so that positioning measurement is performed); or instructing, by means of protocol pre-configuration or higher layer signaling configuration, the terminal device not to transmit the periodic SRS and/or the semi-persistent SRS in the duration configured by the DRX on duration timer (so that no positioning measurement is performed).

After the transmission time of the SRS is determined, regardless of whether the terminal device is in an active state or an inactive state, the terminal device may transmit the SRS according to the set transmission time. Alternatively, in some embodiments, the terminal device may transmit the SRS only in a transmission time, containing the active time, in the transmission time of the SRS.

In some embodiments, before Step S510, Step S505 may further be included, that is, the terminal device receives indication information sent by the serving cell. The indication information may be used to indicate whether transmission of an SRS (such as a periodic SRS and/or a semi-persistent SRS for positioning) ignores a wake-up signal.

In some embodiments, the serving cell or a positioning device may inform a neighboring cell of a transmission time of the SRS. After receiving the transmission time of the SRS, the neighboring cell may perform neighboring cell measurement on the SRS based on the transmission time of the SRS, and report a measurement result to the positioning device so that the positioning device resolves a location of the terminal device.

Figure 6:
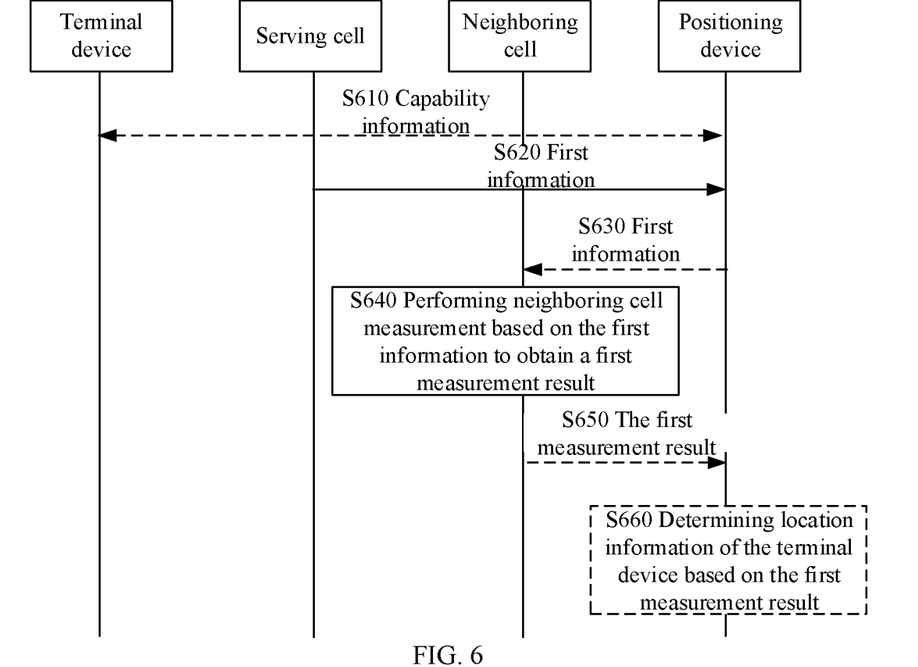
FIG. 6 is a schematic flowchart of a wireless communication method according to another embodiment of the present application.

FIG. 6 is a schematic flowchart of a wireless communication method according to another embodiment of the present application. The method illustrated in FIG. 6 is described from the perspective of interaction between a positioning device, a serving cell (or a base station corresponding to a serving cell), a neighboring cell (or a base station corresponding to a neighboring cell), and a terminal device. The related description of the terminal device, the base station, and the positioning device may be referred to the foregoing description. An NR system is used as an example, the base station may be a gNB, and the positioning device may be an LMF. The base station corresponding to the serving cell and the base station corresponding to the neighboring cell may be a same base station or different base stations.

Referring to FIG. 6, in Step S620, the serving cell sends first information to the positioning device. Alternatively, in some embodiments, the first information may alternatively be sent by the terminal device to the positioning device. For example, the first information is sent by the serving cell. The serving cell generally sends configuration information of an SRS of the terminal device to the positioning device (configuration of the SRS is used by the positioning device to select part of the SRS as an uplink positioning SRS). Thus, in some embodiments, the first information may be sent to the positioning device together with the configuration information of the SRS.

The first information may indicate an actual active time of the terminal device. As mentioned above, the active time of the terminal device is affected by many factors and has randomness. The "actual active time" refers to a time at which the terminal device is actually in an active state (or a time at which the terminal device is really in an active state)

after these factors are considered. The terminal device or the serving cell generally can learn the actual active time accurately. Therefore, the terminal device or the serving cell may send the actual active time to the positioning device so as to help the positioning device to perform positioning and measurement.

The content of the first information is not specifically limited in the embodiments of the present application, provided that the actual active time of the terminal device may be directly obtained or calculated based on the first information. As an example, the first information may directly indicate the actual active time of the terminal device. As another example, the first information may contain various parameters that affect the actual active time of the terminal device, so that the positioning device may derive the actual active time based on these parameters.

Further, in some embodiments, after obtaining the first information, the positioning device may determine a first measurement result based on the first information. The first measurement result referred to herein means a measurement result obtained after the neighboring cell measures an SRS transmitted by the terminal device in an actual active time.

The first measurement result may be determined in various ways, and two possible implementations are given below.

As a possible implementation, referring to FIG. 6, the positioning device sends the first information to the neighboring cell (Step S630). For example, the positioning device may send the first information to the neighboring cell via NR positioning protocol a (NRPPa) signaling. The positioning device generally sends the configuration information of the SRS of the terminal device to the neighboring cell, to make the neighboring cell perform neighboring cell measurement. Thus, in some embodiments, the positioning device may send the first information together with the configuration information of the SRS (or as part of the configuration information of the SRS) to the neighboring cell. After obtaining the first information, the neighboring cell may perform neighboring cell measurement based on the first information to obtain the first measurement result (Step S640). The neighboring cell may then send the first measurement result to the positioning device (see Step S650).

As another possible implementation, the positioning device may alternatively receive a second measurement result obtained by measuring the SRS by the neighboring cell. The second measurement result may include a valid measurement result (such as the first measurement result mentioned above) and an invalid measurement result (such as a measurement result in the second measurement result and with a measurement time being in a dormant time of DRX). Further, the second measurement result may include a measurement time of the SRS. After obtaining the second measurement result, the positioning device may select the first measurement result from the second measurement result based on the measurement time of the SRS included in the second measurement result and the first information obtained previously. For example, the positioning device may screen the second measurement result according to the measurement time of the SRS, and retain a measurement result in the second measurement result and with a measurement time being in an actual active time indicated by the first information.

Referring again to FIG. 6, in some embodiments, the method illustrated in FIG. 6 may further include Step S660 in which the positioning device determines location information of the terminal device based on the first measurement result. Since the first measurement result rule out some or all of invalid measurement results (measurement results obtained in the dormant time of DRX) in neighboring cell measurement results, calculation of the location information of the terminal device may be more accurate.

In some embodiments, before Step S620, the method illustrated in FIG. 6 may further include Step S610 in which the terminal device interacts with the positioning device for capability information of the terminal device. The interaction of the capability information may be implemented through LTE positioning protocol (LPP) signaling. For example, the positioning device may first send an inquiry message to the terminal device to query whether the terminal device has an uplink positioning capability. After receiving the inquiry message, the terminal device may send a response message of the inquiry message to the positioning device to notify the positioning device that the terminal device itself has the uplink positioning capability.

The methods embodiments of the present application are described in detail above with reference to FIG. 1 to FIG. 6. The apparatus embodiments of the present application are described in detail below with reference to FIG. 7 to FIG. 13. It should be understood that the description of the method embodiments corresponds to the description of the apparatus embodiments, and therefore, for parts that are not described in detail, reference may be made to the foregoing method embodiments.

Figure 7:
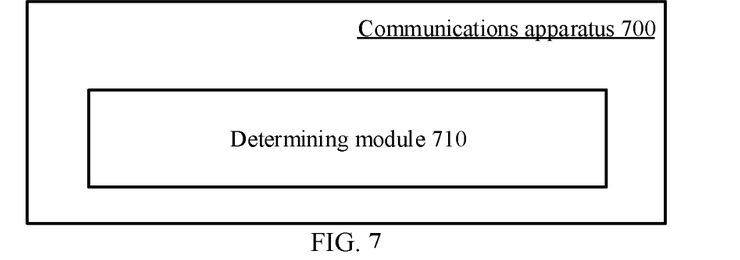
FIG. 7 is a schematic structural diagram of a communications apparatus according to an embodiment of the present application.

FIG. 7 is a schematic structural diagram of a communications apparatus according to an embodiment of the present application. A communications apparatus 700 in FIG. 7 includes a determining module 710. The determining module 710 may be configured to determine a first time window. The first time window is a transmission time window of an SRS for positioning, the first time window is determined based on a DRX on duration timer, and a length of the first time window is a static value.

Optionally, the static value is derived only from higher layer signaling and does not change dynamically with data scheduling.

Optionally, the first time window is notified by a serving cell or a positioning device of a core network to a neighboring cell.

Optionally, a start point of the first time window is the same as a start point of the DRX on duration timer, and the length of the first time window is notified by a higher layer signaling.

Optionally, the SRS is a periodic SRS and/or a semi-persistent SRS.

Figure 8:
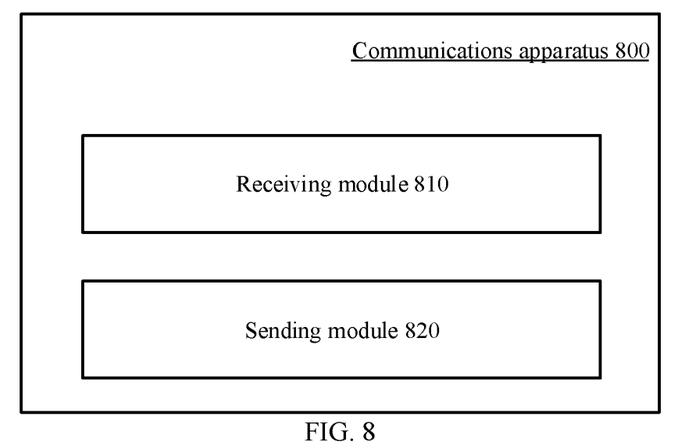
FIG. 8 is a schematic structural diagram of a communications apparatus according to another embodiment of the present application.

FIG. 8 is a schematic structural diagram of a communications apparatus according to another embodiment of the present application. A communications apparatus 800 in FIG. 8 may be a terminal device. The communications apparatus 800 may include a receiving module 810 and a sending module 820. The receiving module 810 may be configured to receive a wake-up signal. The sending module 820 may be configured to transmit an SRS for positioning, and transmission of the SRS ignores the wake-up signal.

Optionally, the receiving module is further configured to receive indication information sent by a serving cell, where the indication information indicates whether transmission of the SRS ignores the wake-up signal.

Optionally, a transmission time of the SRS is notified by a serving cell or a positioning device of a core network to a neighboring cell.

Optionally, the SRS is a periodic SRS and/or a semi-persistent SRS.

Figure 9:
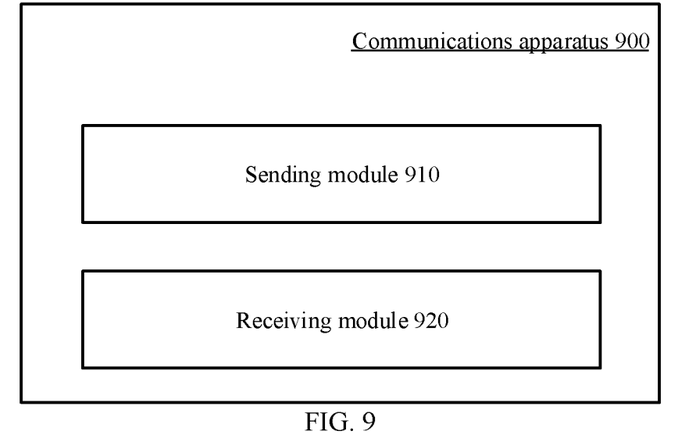
FIG. 9 is a schematic structural diagram of a communications apparatus according to still another embodiment of the present application.

FIG. 9 is a schematic structural diagram of a communications apparatus according to still another embodiment of the present application. A communications apparatus 900 in FIG. 9 may be a base station corresponding to a serving cell. The communications apparatus 900 may include a sending module 910 and a receiving module 920. The sending module 910 may be configured to send a wake-up signal to a terminal device. The receiving module 920 may be configured to receive a sounding reference signal (SRS) for positioning transmitted by the terminal device, where transmission of the SRS ignores the wake-up signal.

Optionally, the sending module may be further configured to send indication information to the terminal device, where the indication information indicates whether transmission of the SRS ignores the wake-up signal.

Optionally, a transmission time of the SRS is notified by a serving cell or a positioning device of a core network to a neighboring cell.

Optionally, the SRS is a periodic SRS and/or a semi-persistent SRS.

Figure 10:
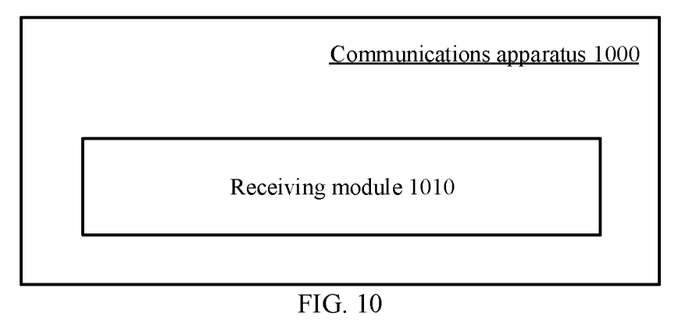
FIG. 10 is a schematic structural diagram of a communications apparatus according to still another embodiment of the present application.

FIG. 10 is a schematic structural diagram of a communications apparatus according to still another embodiment of the present application. A communications apparatus 1000 in FIG. 10 may be a positioning device in a core network. The communications apparatus 1000 may include a receiving module 1010.

The receiving module 1010 may be configured to receive first information sent by a terminal device or a serving cell, where the first information indicates an actual active time of the terminal device.

Optionally, the communications apparatus 1000 may further include a determining module. The determining module may be configured to determine a first measurement result based on the first information, where the first measurement result is a neighboring cell measurement result of a sounding reference signal (SRS) for positioning sent by the terminal device in the actual active time.

Optionally, the determining module is configured to: send the first information to a neighboring cell, and receive the first measurement result from the neighboring cell.

Optionally, the determining module is configured to: receive a second measurement of the SRS from a neighboring cell, where the second measurement includes a measurement time of the SRS; and select the first measurement result from the second measurement result according to the first information and the measurement time of the SRS.

Optionally, the SRS is a periodic SRS and/or a semi-persistent SRS.

Figure 11:
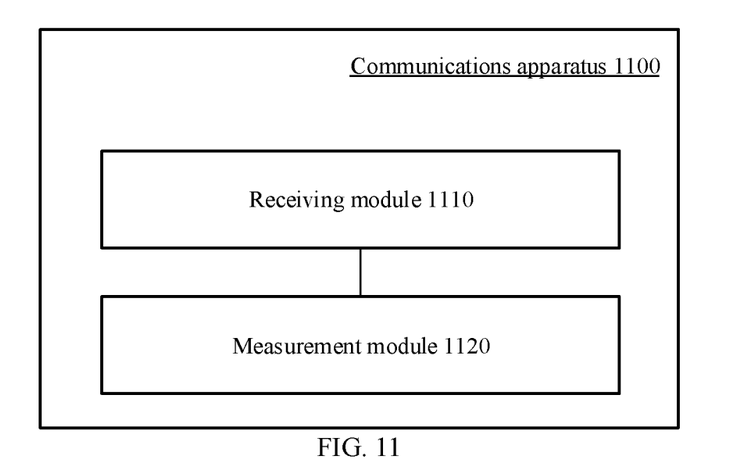
FIG. 11 is a schematic structural diagram of a communications apparatus according to still another embodiment of the present application.

FIG. 11 is a schematic structural diagram of a communications apparatus according to still another embodiment of the present application. A communications apparatus 1100 in FIG. 11 may be a base station to which a neighboring cell belongs. The communications apparatus 1100 may include a receiving module 1110 and a measurement module 1120. The receiving module 1110 may be configured to receive a transmission time window of a sounding reference signal (SRS) for positioning. The measurement module 1120 may be configured to measure the SRS in the transmission time window of the SRS.

Figure 12:
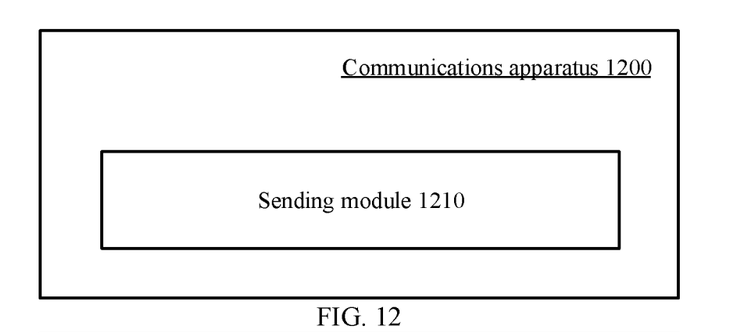
FIG. 12 is a schematic structural diagram of a communications apparatus according to still another embodiment of the present application.

FIG. 12 is a schematic structural diagram of a communications apparatus according to still another embodiment of the present application. A communications apparatus 1200 in FIG. 12 may be a base station corresponding to a terminal device or a serving cell. The communications apparatus 1200 may include a sending module 1210. The sending module 1210 may be configured to send first information to a positioning device in a core network, where the first information indicates an actual active time of the terminal device.

Figure 13:
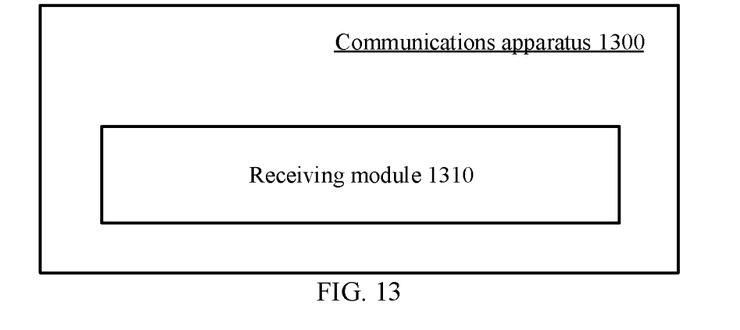
FIG. 13 is a schematic structural diagram of a communications apparatus according to still another embodiment of the present application.

FIG. 13 is a schematic structural diagram of a communications apparatus according to still another embodiment of the present application. A communications apparatus 1300 in FIG. 13 may be a base station corresponding to a neighboring cell. The communications apparatus 1300 may include a receiving module 1310. The receiving module 1310 may be configured to receive first information from a positioning device in a core network, where the first information indicates an actual active time of a terminal device.

Optionally, the communications apparatus 1300 may further include a measurement module and a sending module. The measurement module may be configured to measure, based on the first information, an SRS for positioning sent by the terminal device in the actual active time, to obtain a first measurement result. The sending module may be configured to send the first measurement result to the positioning device.

Optionally, the SRS is a periodic SRS and/or a semi-persistent SRS.

Figure 14:
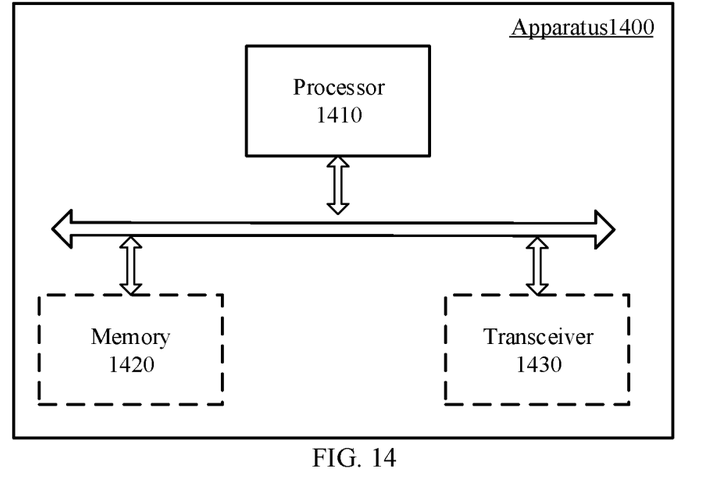
FIG. 14 is a schematic structural diagram of an apparatus according to the present application.

FIG. 14 is a schematic structural diagram of an apparatus according to an embodiment of the present application. The dashed lines in FIG. 14 indicate that the unit or module is optional. The apparatus 1400 may be configured to implement the methods described in the foregoing method embodiments. The apparatus 1400 may be a chip, a terminal device, a base station or a positioning device.

The apparatus 1400 may include one or more processors 1410. The processor 1410 may allow the apparatus 1400 to implement the methods described in the foregoing method embodiments. The processor 1410 may be a general-purpose processor or a dedicated processor. For example, the processor may be a central processing unit (CPU). Alternatively, the processor may be another general-purpose processor, a digital signal processor (DSP), an application-specific integrated circuit (ASIC), a field-programmable gate array (FPGA) or another programmable logic device, a discrete gate or transistor logic device, or a discrete hardware component. The general-purpose processor may be a microprocessor, or the processor may be any conventional processor or the like.

The apparatus 1400 may further include one or more memories 1420. The memory 1420 stores a program that may be executed by the processor 1410 to cause the processor 1410 to perform the methods described in the foregoing method embodiments. The memory 1420 may be independent of the processor 1410 or may be integrated in the processor 1410.

The apparatus 1400 may further include a transceiver 1430. The processor 1410 may communicate with another device or chip through the transceiver 1430. For example, the processor 1410 may send and receive data to and from another device or chip through the transceiver 1430.

An embodiment of the present application further provides a computer-readable storage medium for storing a program. The computer-readable storage medium may be applied to the terminal, the base station, or the positioning device provided in the embodiments of the present application, and the program causes a computer to perform the methods to be performed by the terminal, the base station, or the positioning device in various embodiments of the present application.

An embodiment of the present application further provides a computer program product. The computer program product includes a program. The computer program product may be applied to the terminal, the base station, or the positioning device provided in the embodiments of the present application, and the program causes a computer to perform the methods to be performed by the terminal, the base station, or the positioning device in various embodiments of the present application.

An embodiment of the present application further provides a computer program. The computer program may be applied to the terminal, the base station, or the positioning device provided in the embodiments of the present application, and the program causes a computer to perform the methods to be performed by the terminal, the base station, or the positioning device in various embodiments of the present application.

It should be understood that, in the embodiments of the present application, "B that is corresponding to A" means that B is associated with A, and B may be determined based on A. However, it should also be understood that, determining B based on A does not mean determining B based only on A, but instead B may be determined based on A and/or other information.

It should be understood that, in this specification, the term "and/or" is merely an association relationship that describes associated objects, and represents that there may be three relationships. For example, A and/or B may represent three cases: only A exists, both A and B exist, and only B exists. In addition, the character "/" herein generally indicates an "or" relationship between the associated objects.

It should be understood that, in the embodiments of the present application, sequence numbers of the foregoing processes do not mean execution sequences. The execution sequences of the processes should be determined according to functions and internal logic of the processes, and should not be construed as any limitation on the implementation processes of the embodiments of the present application.

In several embodiments provided in the present application, it should be understood that, the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatus or units may be implemented in electronic, mechanical, or other forms.

The units described as separate components may be or may not be physically separated, and the components displayed as units may be or may not be physical units, that is, may be located in one place or distributed on a plurality of network units. Some or all of the units may be selected according to actual needs to achieve the objective of the solutions of the embodiments.

In addition, function units in the embodiments of the present application may be integrated into one processing unit, or each of the units may exist alone physically, or two or more units may be integrated into one unit.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the procedures or functions according to the embodiments of the present application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center via a wired (such as a coaxial cable, an optical fiber, and a digital subscriber line (DSL)) manner or a wireless (such as infrared, wireless, and microwave) manner. The computer-readable storage medium may be any usable medium readable by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

The foregoing descriptions are merely specific implementations of the present application, but the protection scope of the present application is not limited thereto. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A wireless communication method, comprising:
   receiving, from higher layer signaling, a positioning time window length that is a length of time between a start time of a first time window for positioning and an end time of the first time window for positioning;
   determining the first time window for positioning based on a discontinuous reception (DRX) on duration time and the received positioning time window length, wherein the first time window is a transmission time window for transmitting a reference signal, and the positioning time window length is different than the DRX on duration time;
   transmitting or receiving the reference signal by using the first time window; and
   receiving or transmitting indication information indicating whether to ignore a wake-up signal when transmitting a reference signal for positioning.

2. The method according to claim 1, wherein the first time window is transmitted by a base station of a serving cell or a positioning device of a core network to a base station of a neighboring cell.

3. The method according to claim 1, wherein determining the first time window for positioning comprises:
   determining the start time of the first time window to be same as a start point of the DRX on duration time.

4. The method according to claim 1, wherein the reference signal is a sounding reference signal (SRS).

5. The method according to claim 1, wherein when the first time window comprises a transmission occasion of a wake-up signal, omitting a transmission of the wake-up signal or the reference signal.

6. The method according to claim 5, wherein the omitting the transmission of the wake-up signal is indicated by a higher layer signaling.

7. An apparatus, comprising:

at least one processor; and one or more memories coupled to the at least one processor and storing programming instructions for execution by the at least one processor to cause the apparatus to perform operations comprising:

receiving, from higher layer signaling, a positioning time window length that is a length of time between a start time of a first time window for positioning and an end time of the first time window for positioning;

determining the first time window for positioning based on a discontinuous reception (DRX) on duration time and the received positioning time window length, wherein the first time window is a transmission time window for transmitting a reference signal, and the positioning time window length is different than the DRX on duration time;

transmitting or receiving the reference signal by using the first time window; and receiving or transmitting indication information indicating whether to ignore a wake-up signal when transmitting a reference signal for positioning.

8. The apparatus according to claim 7, wherein the first time window is transmitted by a base station of a serving cell or a positioning device of a core network to a base station of a neighboring cell.

9. The apparatus according to claim 7, wherein determining the first time window for positioning comprises:

determining the start time of the first time window to be same as a start point of the DRX on duration time.

10. The apparatus according to claim 7, wherein the reference signal is a sounding reference signal (SRS).

11. The apparatus according to claim 7, wherein when the first time window comprises a transmission occasion of a wake-up signal, omitting a transmission of the wake-up signal or the reference signal.

12. The apparatus according to claim 11, wherein the omitting the transmission of the wake-up signal is indicated by a higher layer signaling.

13. One or more non-transitory computer-readable media storing computer instructions, that when executed by one or more processors, cause a computing device to perform operations comprising:

receiving, from higher layer signaling, a positioning time window length that is a length of time between a start time of a first time window for positioning and an end time of the first time window for positioning;

determining the first time window for positioning based on a discontinuous reception (DRX) on duration time and the received positioning time window length, wherein the first time window is a transmission time window for transmitting a reference signal, and the positioning time window length is different than the DRX on duration time;

transmitting or receiving the reference signal by using the first time window; and receiving or transmitting indication information indicating whether to ignore a wake-up signal when transmitting a reference signal for positioning.

14. The one or more non-transitory computer-readable media according to claim 13, wherein the first time window is transmitted by a base station of a serving cell or a positioning device of a core network to a base station of a neighboring cell.

15. The one or more non-transitory computer-readable media according to claim 13, wherein determining the first time window for positioning comprises:

determining the start time of the first time window to be same as a start point of the DRX on duration time.

16. The one or more non-transitory computer-readable media according to claim 13, wherein the reference signal is a sounding reference signal (SRS).

17. The one or more non-transitory computer-readable media according to claim 13, wherein when the first time window comprises a transmission occasion of a wake-up signal, omitting a transmission of the wake-up signal or the reference signal.

* * * * *